Sept. 15, 1970  J. B. DUFF ETAL  3,528,170
METHOD AND APPARATUS FOR AXIALLY DEVELOPING ELECTRICAL COILS
Filed Aug. 1, 1967  4 Sheets-Sheet 3
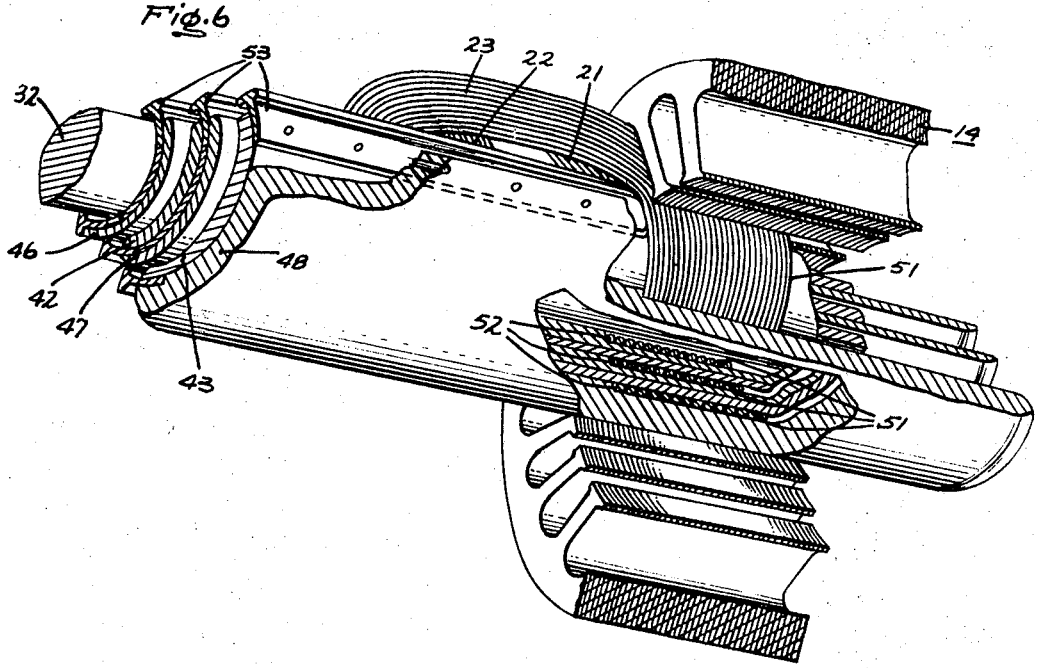
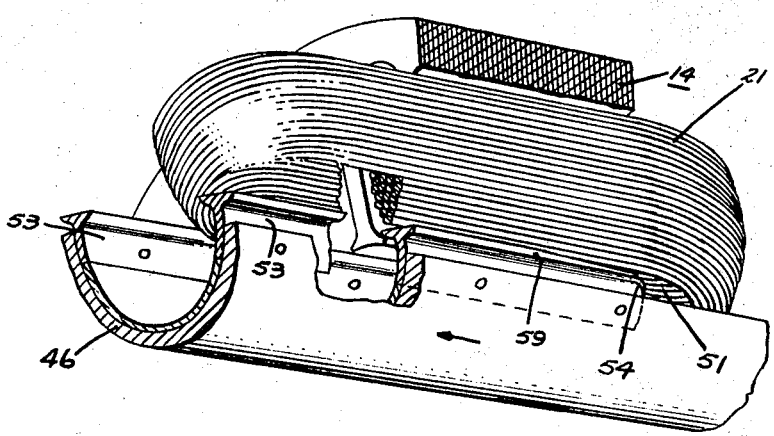
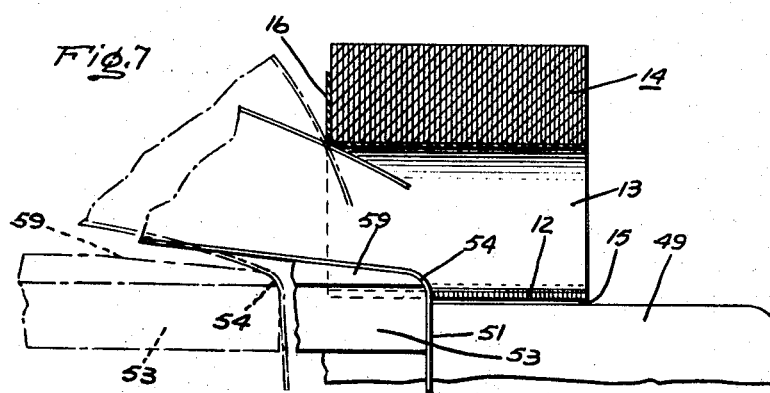
INVENTORS
James B. Duff,
Lowell M. Mason,
by John R. Stoudt
Attorney.

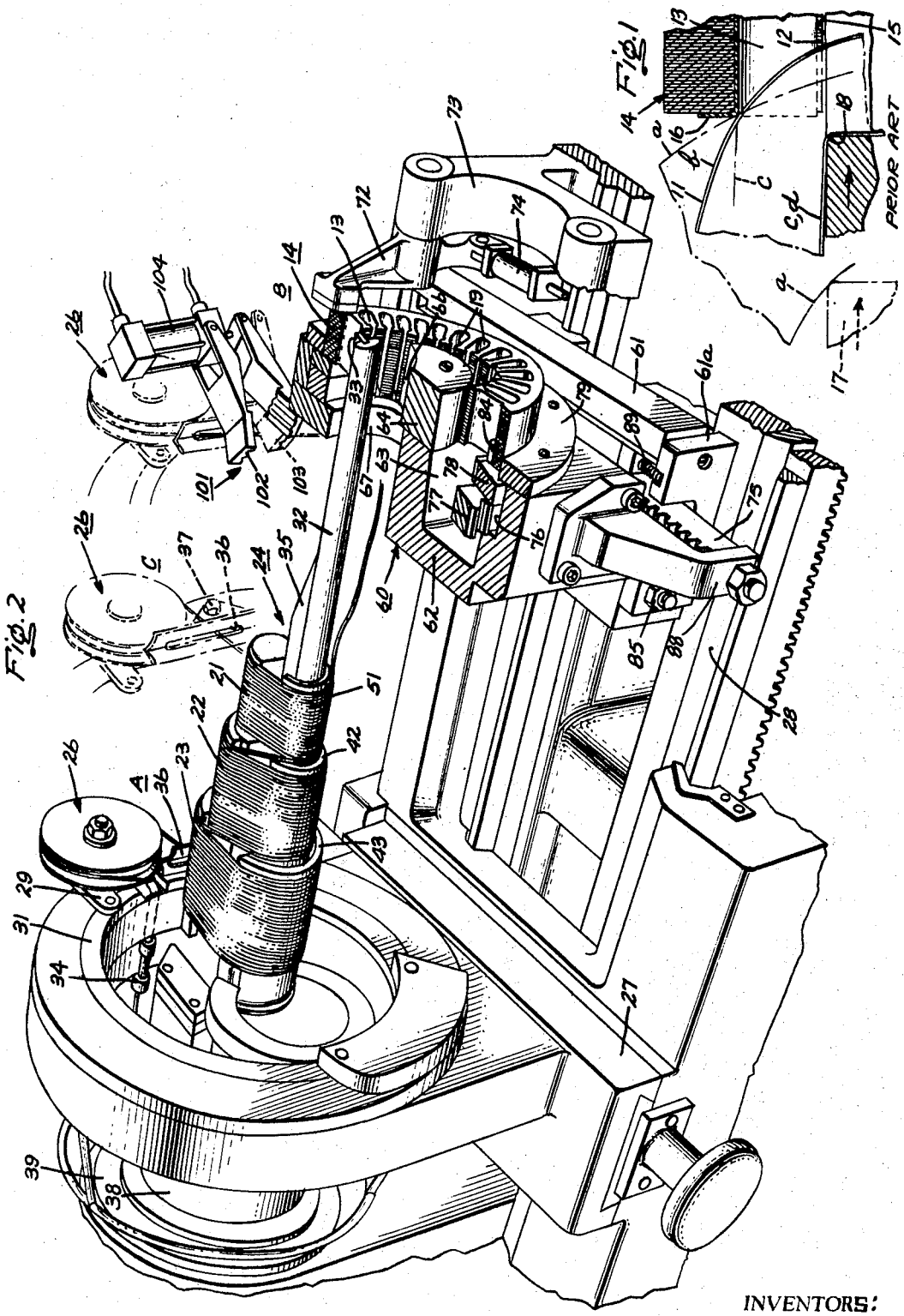

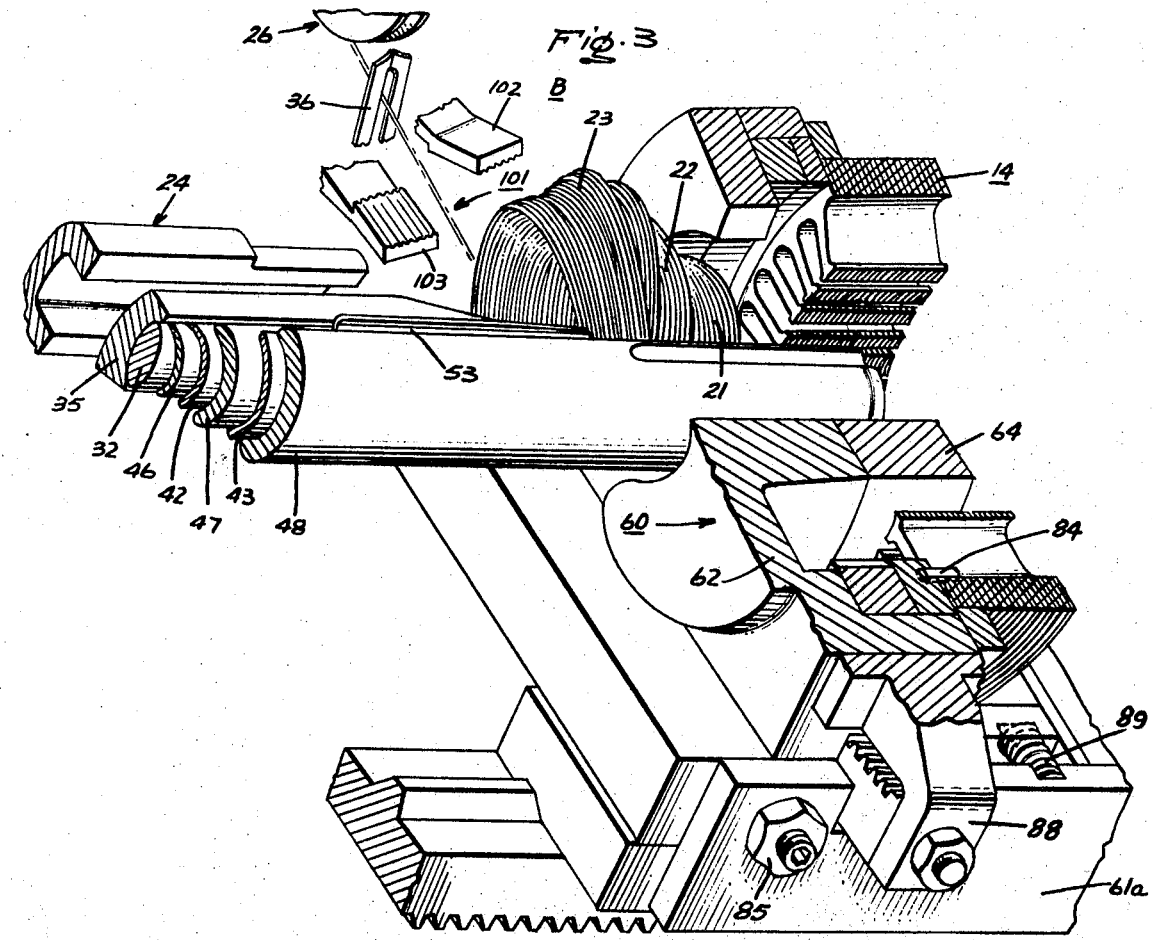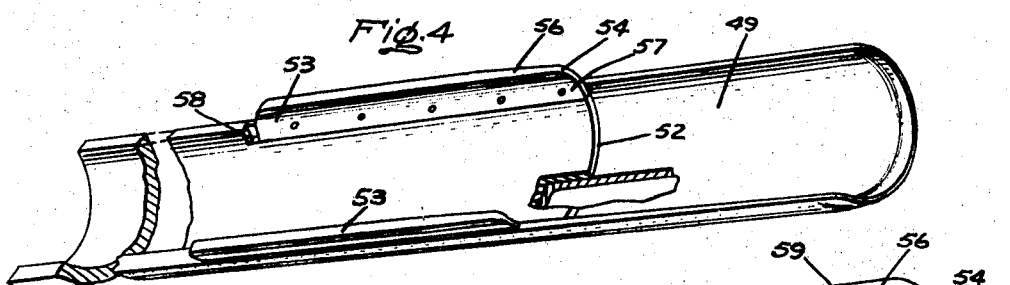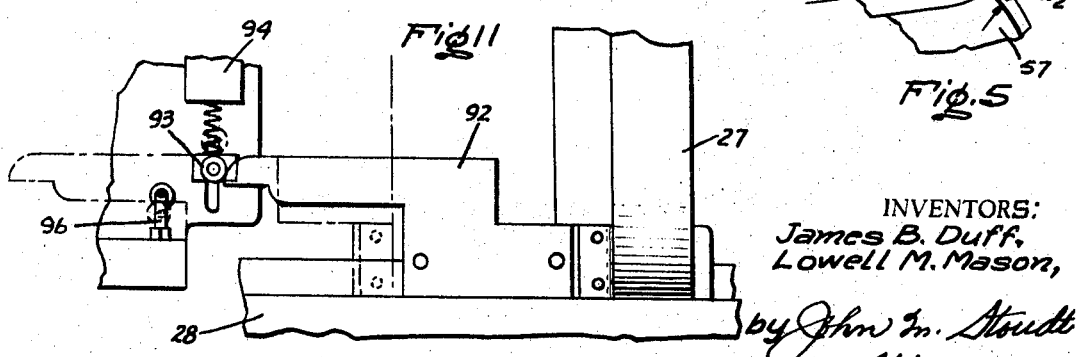

Sept. 15, 1970     J. B. DUFF ETAL     3,528,170
METHOD AND APPARATUS FOR AXIALLY DEVELOPING ELECTRICAL COILS
Filed Aug. 1, 1967     4 Sheets-Sheet 4

INVENTORS:
James B. Duff
Lowell M. Mason,
by John M. Stoudt
Attorney.

United States Patent Office 3,528,170
Patented Sept. 15, 1970

3,528,170
METHOD AND APPARATUS FOR AXIALLY DEVELOPING ELECTRICAL COILS
James B. Duff and Lowell M. Mason, Fort Wayne, Ind., assignors to General Electric Company, a corporation of New York
Filed Aug. 1, 1967, Ser. No. 657,666
Int. Cl. H02k *15/00*
U.S. Cl. 29—596        15 Claims

ABSTRACT OF THE DISCLOSURE

Method and apparatus for axially inserting electrical coils into selected slots of a dynamoelectric machine core through slot entrances which forces insulated turn portions of the coils in the slots away from the slot entrances without deleteriously affecting either the turn portions or the insulation covering the portions. Curved wall sections of tools engage the turn portions and axially enter the slots as they inject the portions into the slots through the slot entrances. Tapered sections trailing the curved sections assist in the proper injection of the turn portions axially into the slots while facilitating axial removal of the tools after the portions have been properly inserted. With the turn portions pressed away from the slot entrances, their tendency to pass back through the entrances and to either interfere with the removal of the tools or a subsequent indexing of the core into another angular position for receiving additional coils is minimized.

BACKGROUND OF THE INVENTION

The present invention relates to an improved method and apparatus for axially developing electrical coils, and in particular to an improved method and apparatus for developing electrical conductors into coil turns and axially inserting the turns into magnetic core slots of dynamoelectric machines.

In the construction of certain electrical coils wound of a number of conductor turns, the coil turns are accommodated in axially extending internal slots of magnetic structures which have dimensionally restricted entrances in communication with central openings, for instance, rotor-receiving bores of dynamoelectric machine stator members. One of the more attractive and generally accepted approaches for developing these coils includes the so-called axial insertion of the conductor turns through the restricted entrances into the slots of the members. Representative of this approach is that disclosed in the A. P. Adamson Pat. No. 2,432,267.

In the development of the coils for a given winding, for example, a winding having a number of angularly spaced apart polar coil groups formed of a plurality of concentric coils, the coil or coils to be inserted are normally positioned onto turn-inserting tools by initially placing one end turn portion of each coil into an axially extending slot of the tool. Thereafter, the two side turn portions of each coil are concurrently inserted through the restricted slot entrances located at the bore into selected angularly spaced apart slots. In one typical application, the tools are moved axially into the stator bore to force the side turn portions into the slots in single file through the restricted slot entrances. The tools are subsequently removed from the bore, and the stator core indexed into another angular position preparatory to the insertion of side portions of coils in another coil group.

This procedure has not been entirely satisfactory for one reason or another. Taking the application mentioned above, by way of illustration, during insertion of the side turn portions through the restricted slot entrances, there is a possibility or tendency for the coil turns to be improperly bent and the insulation covering the turns adversely affected. In addition, a few of the side turn portions may return into the bore of the core and cause interference with the proper indexing of the core as well as subsequent installation of additional coils.

These problems may be better appreciated and understood from a consideration of FIG. 1 which, for the sake of simplicity, illustrates the axial insertion of one side turn portion of one coil 11 through a restricted slot entrance 12 into a selected slot 13 of a slotted structure. For the purpose of discussion, it will be assumed that the slotted structure is a stator core 14 having slots in communication with a central bore 15 similar to that illustrated in the R. L. Balke Pat. 2,838,703 issued June 10, 1958. Standard electrical insulation 16, such as that revealed in the N. Baciu Pat. 3,122,667 or conventional U-shaped slot liners, cover the internal slot walls and the edges at the end faces of the core. During insertion of the turns into the slot by turn-inserting tool 17, the turns are transferred by pressure engagement of the innermost turn and a relatively narrow shoulder 18 of the tool adapted to enter bore 15. As the tool and turns travel in the direction of the arrow (toward the selected slot) the outermost turns make initial contact with the core in the vicinity of the slot edge, denoted by letter $a$. Continued axial movement of the tool forces these turns from position $a$, through $b$ to position $c$ as the side portions are being placed into the slots. This, in turn, causes the innermost turns of the coil to be bent from position $a$ to $c$, $d$ around shoulder 18 as these turns are being pushed in an axial direction in the vicinity of the restricted entrance 12. This action may produce nicks, scrapes, or other injury to the insulation covering at least the innermost turns, especially near shoulder 18, as well as injury to the wire itself. One reason for this may be due to the type of pressure being applied to the turns in the neighborhood of the bend where the turns may become reduced in cross-section at that location and scraped by the tool, particularly troublesome where the turns are fabricated from aluminum material. In addition, since some of the innermost side portion turns tend to be disposed at the slot entrance 12 after they have been inserted by tool 17, they may become wedged between the bore and the tool to cause interference with the retraction of the tool from the bore. In the alternative, these turns may fall into the bore once the tool has been removed from the bore and cause interference with the proper indexing operation of the stator core. Some of these deficiencies may be of sufficient magnitude to produce an unacceptable product which may be discovered only after the entire winding has been installed on the core. This is both costly and time consuming.

Accordingly, it is a primary object of the present invention to provide an improved method and apparatus for axially developing electrical coils, and it is a more specific object to provide such development which overcomes at least some of the difficulties mentioned above.

It is another object of the present invention to provide an improved method and apparatus for axially developing electrical coils in dynamoelectric machine stator slots in an efficient and economical manner which tend to produce consistently satisfactory results.

It is still another object of the invention to provide an improved method and apparatus for axially inserting conductor turn side portions into magnetic core slots through restricted slot entrances of the core with the side turn portions tending to remain in the slots as other operations, such as indexing of the core and inserting additional turns into the slot, are being performed to the core.

SUMMARY OF THE INVENTION

In carrying out the objects in one form, we provide an improved method and apparatus for axially developing electrical coils in selected slots of a slotted structure, for instance, the slots of a dynamoelectric machine stator core. One or more electrical coils are formed with a number of conductor turns at a first position and are transferred axially toward the selected slots of the core which is firmly supported at a second predetermined position. This transfer is effected by pressure-applying surfaces of tools having curved wall sections in pressure engagement with some of the turns. Thereafter, side turn portions of the coils are axially inserted into the selected slots by the tools in which the curved wall sections enter the slots at one end face of the core as the core is being firmly supported in axial alignment with the first position. As the side turn portions are being inserted, the individual turns in the selected slots are being forced away from the associated slot entrances by the curved wall sections which also fit into the slot entrances.

Sections disposed next to and trailing the curved sections taper axially and radially away from the curved sections and coact with the curved section in reducing the tendency of the turn portions to be improperly bent at those locations by virtue of the axial insertion of the coils into the selected slots. These sections also insure the lack of any extensive or appreciable relative sliding movement between the tool sections and the engaged turn portions as the portions are being pressed away from the slot entrances during their insertion into the slots to minimize potential damage to the insulation as well as to the conductors themselves. This is especially critical when the conductors are formed of aluminum or aluminum alloy material and the insulation is not composed of highly scrape-resistant material. Additionally, withdrawal of the sections from the slots and associated entrances is facilitated without the tendency of the portions to pass back through the slot entrances and interfere with either the removal of the tools or the proper indexing of the core to another angular position. For some applications, the degree of turn press-back attained in the slots during injection may be of sufficient magnitude to permit installation of additional coils in the same slots without requiring the performance of a subsequent pressing operation of the side turn portions.

In regard to the indexing of the core, where such is desired it may easily be accomplished by first moving the core in a radial direction to release it from the second position, turning or indexing the core through a predetermined angle, and finally returning the core to the second position with certain slots in alignment with the first position preparatory to the axial insertion of additional coils.

The subject matter which we regard as our invention is particularly pointed out and distinctly claimed in the concluding portion of this specification. Our invention, however, both as to organization and method of operation, together with further objects and advantages thereof, may be best understood with reference to the following description taken in conjunction with the accompanying drawings.

BRIEF DESCRIPTION OF THE DRAWINGS

FIG. 1 is an enlarged fragmentary view of one coil side portion being inserted into a slot of a slotted structure to illustrate a representative type of coil development produced by methods and apparatus of the prior art;

FIG. 2 is a partial view in perspective, partly broken away to show details of apparatus incorporating one form of the present invention and capable of practicing the inventive method for developing electrical coils, including the forming and inserting of a polar group of coils in connection with slotted structures, such as the illustrated stator core for use in a single phase dynamoelectric machine;

FIG. 3 is a partial view in perspective of certain apparatus components seen in FIG. 2 revealing the position of some components and the formed coils in alignment with selected slots of a stator core in the exemplification just prior to insertion of the coils into these slots during the practice of the form of the present invention;

FIG. 4 is a partial view in perspective, partly broken away to show details, of the preferred form of one of the coil transferring and inserting elements incorporated in the apparatus of FIG. 3;

FIG. 5 is an enlarged partial view of the leading edge of the transferring and inserting element seen in FIG. 4;

FIG. 6 is a partial view in perspective, partly broken away, of the apparatus in the exemplification inserting the pre-wound coils axially into the selected slots;

FIG. 7 is a sectional view, partly in schematic form of one of the selected slots showing the manner in which the transferring and inserting elements typically effect axial insertion of side portions of the coils into the selected slots;

FIG. 8 is fragmentary view in perspective showing a single coil transferring and inserting mechanism for one coil in the extended position, with the one coil having its side turn portions disposed in the selected slots for that coil;

FIG. 11 is a side elevational view of a part of the apparatus shown in FIG. 1 revealing one way in which operation of the stator support and indexing mechanism and related components such as a wire retainer may be actuated at the proper time.

DESCRIPTION OF THE PREFERRED EMBODIMENT

Figure 10:
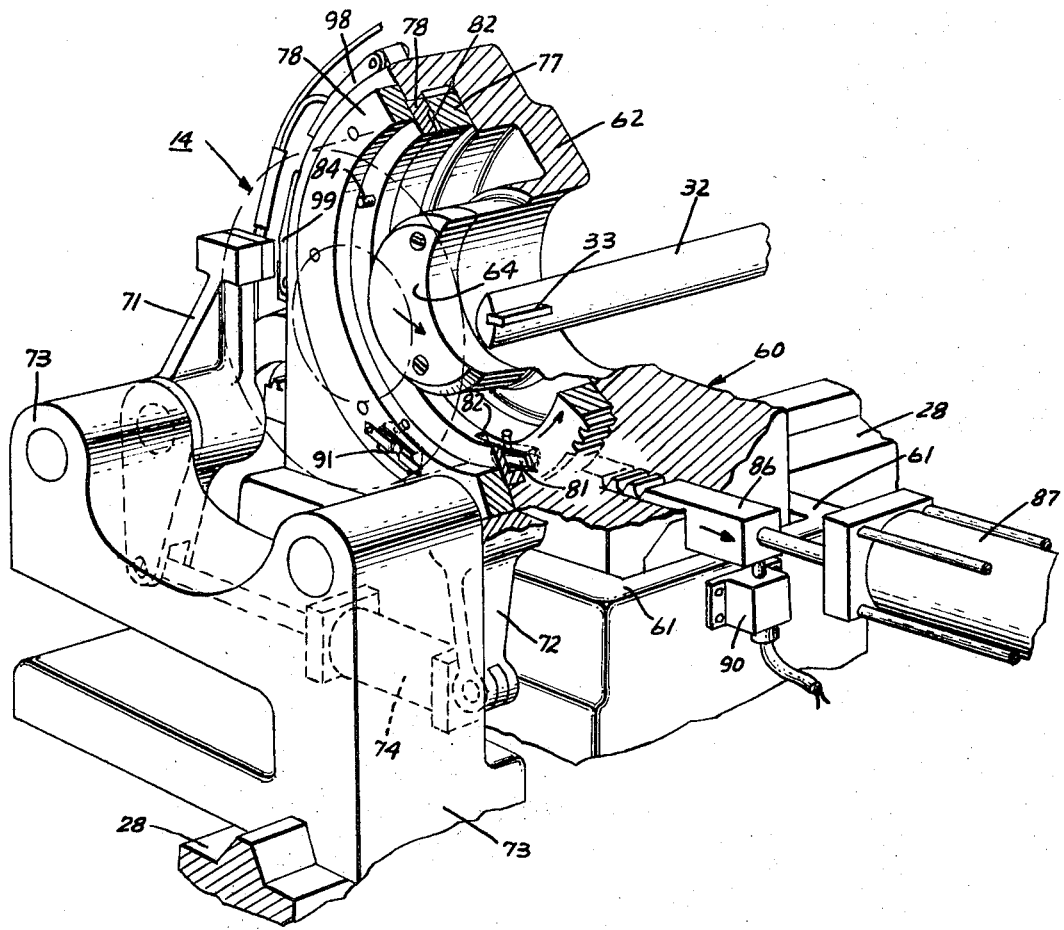
FIG. 10 is an enlarged fragmentary view in perspective partially broken away of the certain components seen in FIGS. 1 and 9 which control the position of the stator core.

Having more specific reference to the drawings, we have illustrated the axial development of electrical coils of one form of our invention in connection with a dynamoelectric machine stator core 14 of the kind already discussed with respect to FIG. 1 for convenience of presentation. In the exemplification the stator core has thirty-six equally spaced apart slots 13 for accommodating at least one distributed winding. Although in the exemplification the preferred embodiment of the present invention is shown in the axial development of polar coil groups having three concentrically disposed electrical coils 21, 22 and 23 (innermost to outermost coil) which respectively span four, six and eight core teeth 19. To provide a four pole arrangement, this is merely by way of illustration. However, it will be obvious to those skilled in the art from this disclosure that the present invention is applicable in the development of one or more electrical coils axially installed in suitable slotted magnetic structures and is not limited to that illustrated.

For the sake of brevity, the preferred method is described below in connection with apparatus which may be utilized in its practice. Referring in particular to FIG. 2, in the exemplification, the desired number of coils are intially formed or wound with a prechosen number of turns per coil from insulated electrically conductive wire at a first location or position, denoted by letter A. This may be accomplished in any suitable manner, such as collapsible, stepped cantilever mounted coil form 24 and flyer 26 rotatably carried by an axially movable carriage 27 mounted for movement on a machine frame 28, the parts having the same general construction more fully set out in the L. M. Mason Pat. 2,934,099 issued Apr. 26, 1960. The flyer includes a wire receiving pulley rotatably mounted to a flange 29 of ring gear 31. Coils 21–23 inclusive are formed by moving the carriage 27 from the position shown by the broken lines at position C in an axial direction away from the free end of winding form 24 as the flyer rotates around the form to wind the wire or conductor turns tightly over the form in the illustrated manner. A counter (not shown) may be included to regulate the number of turns in each coil. Since these details are more fully outlined in the Mason patent, no further description will be set forth here of the coil forming operation, except to note that the illustrated form includes an elongated stationary member 32 extending axially toward position B, with its free end having a key 33 adapted to fit into a particular slot entrance of core 14 for insuring proper axial alignment between positions A and B. A metal support 35 may be secured next to member 32 for augmenting rigidity of the member. In addition, the wire may be fed axially through the machine from a wire spool (not shown) located at the rear of the frame, through a tubular passage 34 and pulley groove of the flyer, into a slotted wire guide 36 attached to rotate with ring gear 31 by bracket 37.

Once the coil-forming or winding operation has been completed and the flyer is in the retracted position, the coil form is collapsed to release the coils in the way described more fully in the Mason patent. The coils are then transferred from position A toward position B, (best seen in FIG. 3) where the stator core is supported, for axial insertion into selected slots of the core. In order to effect the transfer, a transferring and inserting device is provided which has elongated tools suitably mounted within a tubular sleeve 38 (FIG. 1) attached to housing 39, for instance, as shown by the Mason patent. The elongated tools include transversely curved divider members 42, 43, which serve as part of the winding form, and separate pusher elements 46, 47 and 48 (FIGS. 3 and 6) corresponding in number to that of the coils to be inserted, e.g., three in number in the exemplification. Each of these elements in turn incorporates a channel 49 for receiving individual turns in a row (FIGS. 1, 6 and 7) of the end turn portions 51 for the respective coils, the channel terminating in a transverse shoulder 52 (FIGS. 4 and 6) for engaging the innermost turn of portons 51.

In accordance with an aspect of the present invention, the tools of the preferred embodiment have blade extensions 53 formed with a leading section 54 having a continuous and highly polished curved wall surface projecting outwardly beyond channel 49. As best seen in FIG. 5, the radially outermost region 56 is dimensioned so that it is capable of entering a selected slot from the end face of the core 14 disposed toward position A while region 57 is adapted to pass axially into the associated slot entrance. More specifically region 57 has a transverse dimension $W_2$ less than $W_1$ of region 56, the sections preferably having slip fits with adjacent core walls. For example, taking a core having a slot entrance with a nominal width of 0.092 inch, the dimension $W_2$ preferably is in the neighborhood of 0.055 inch. Within the slot the dimension of $W_2$ should provide a clearance such that terns will not become trapped or pinched between the extension and the insulated slot walls. Although the pusher elements have been shown constructed in three assembled together pieces of hard metal, such as steel, the elements could be fabricated in a single piece. However, by making at least extension 53 a separate part and securing it in recess 58 (see FIG. 4) it is possible to construct this part of hardened wear-resistant material, e.g., oil hardened tool steel, and replace it rather than the entire assembly should such ever become necessary, for instance, when a core has differing slot configurations. Thus, extensions 53 formed with complementary cross-sections to the slots may be easily substituted for the one shown.

During transfer of the coils, the dividers 42, 43 are moved axially over the next adjacent coils 21, 22 and 23 and the tool elements driven into pressure engagement with some of the turns at leading section wall 54 and adjacent shoulder 52. The tools and coils then travel as a unit axially toward position B alongside member 31, until the forwardmost coil 21 is disposed adjacent core 14. At this time the tool components associated with coil 21 pause momentarily to permit coils 22 and 23 to become sequentially radially aligned with coil 21 as seen in FIG. 3. As this occurs, the flyer 26 and carriage 27 travel into the location revealed in phantom in FIG. 1, next to position B. This prevents the conductor wire from being pulled through the flyer during coil transfer and places a part of the wire next to the coils in a position to be retained near position B for the start of winding of another polar coil group, should that be desired. This will be considered in more detail hereinafter.

Continual axial movement of the tools in the manner shown by FIGS. 6 and 7 will force the outermost turns of a given coil against slot insulation 16 and the innermost turns downwardly into ultimate pressure engagement with the trailing section 59 of extension 53, located immediately behind curved wall section 54. This action may be observed in FIG. 7 by comparing the broken line and solid positions of these parts. It should be noted from FIGURE 7 that the curved smooth contour of section 54 and its blending with that of section 59 reduces the tendency of the inner turns to be permanently bent beyond the degree desired. To insure this end, when the curve is formed as a part of a circle, it should have a radius $r_1$ of at least ⅛ inch or more. The trailing section may taper radially and axially away from section 54, for instance 5° above the horizontal, to further reduce the tendency of the turns to be bent excessively.

As the side turn portions are being inserted into the slots by the tools, the extensions effect a press-back of the turns away from the slot entrances without causing relative sliding motion to occur between the extension and the coils in spite of the pressure engagement existing at sections 54, 59. Consequently, even wire insulation composed of material having relatively low abrasion resistance qualities will not be deleteriously affected. Moreover, the potential chance of relatively ductile conductor material, such as aluminum and aluminum alloy, to stretch and become thin at that location will also be reduced.

As insertion of the coils is being achieved, the free ends of dividers 42, 43 and elements 46, 47, 48 travel into the bore of the core, with the dividers being stopped in radial alignment to stationary member 32 at the other end face of the core and the free ends of the elements traveling axially beyond that location. Once the coils have been properly inserted into the slots to the position depicted by FIG. 8, the tools are retracted from the core and their extended positions at B and returned to position A (FIG. 1) preparatory to forming, transferring and inserting another polar group of coils. The curvature of sections 54 and taper of sections 59 facilitate the axial withdrawal of the extensions from the slots without disturbing the press-back of the side turn portions in the slots, away from the slot entrances and bore. It should be noted from FIG. 8 that the axial length of extensions 53 is preferably great enough to allow them to protrude rearwardly beyond the adjacent end turns when the tools are in their extended positions. This, as well as forming the trailing edge with a curved surface, insures minimum interference by these adjacent end turns during retraction of the tools from the core.

With the type of insertion and press-back achieved, the tendency of the individual turns nearest the slot entrances to pass back through the entrances toward the bore is effectively reduced, if not entirely eliminated. For some applications, the turns in the slots will be sufficiently pressed back to permit the subsequent installation of more coils, such as a second phase winding, into the same slots without requiring that additional pressing operations be performed to the side turn position in these slots. Moreover, the transfer and injection of the coils is achieved economically and rapidly; e.g., approximately two seconds for coils 21–23 having thirty-two, forty-two, and forty-eight turns respectively.

Figure 9:
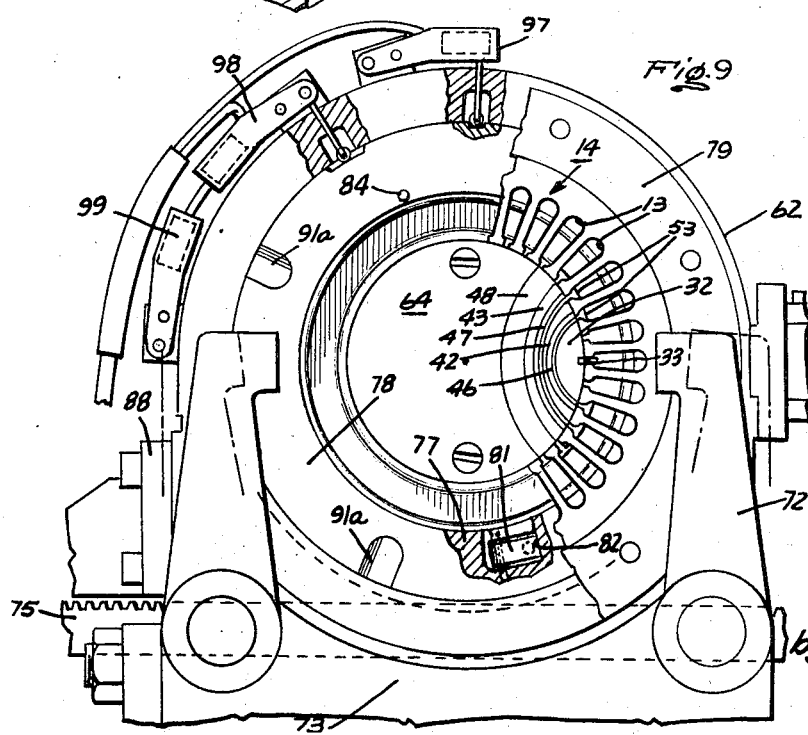
FIG. 9 is an end view of stator support and indexing components included in the apparatus shown in FIG. 1 employed to control the position of the stator core, with the coil transferring and inserting elements being seen in their extended postions, and with the inserted coils of the particular polar coil group being removed for the purposes of clarity.

Turning now to FIGS. 1, 3, 9 and 10, the illustrated arrangement for supporting the core 14 at position B and sequentially indexing it will now be reviewed. An upright mechanism or assembly 60 is mounted for transverse or radial sliding movement in a base 61 attached to frame 28. Upright wall 62 of the assembly furnishes a recess 63 for accommodating coil end turns (not shown) of coils already installed on the core. Wall 62 has an axial section detachably mounting a mandrel 64 formed with a partially cylindrical outer surface adapted to fit into the bore of the core 14 for support thereof. Wall 62 and mandrel 64 are constructed with aligned apertures 66, 67 suitably curved to permit passage of the tools and member 32 into the bore of the core while providing additional support for the tools by virtue of the sliding relation between mandrel 64 and element 48. A pair of spaced apart arm members 71, 72 are pivotally attached to a stationary support 73 of frame 28 on the side of assembly 60 remote from coil form 24 and are operative between closed and open positions (FIG. 9). When in the closed position, they are normally spaced axially slightly from the core end face, except during insertion of the coils into the selected slots when the arms receive axial thrust from the stator core resulting from the insertion step. Otherwise, even while in the closed position, the arms and core may be relatively movable to allow proper indexing of the core. In the open position, the arms release the core for removal from assembly 60. These arms may be suitably actuated between the two positions to remove a finished core 14 having all coils in place, e.g., four polar coil groups (not shown) in the exemplification, and to place another core. An air cylinder 74 (FIG. 10) is provided for this purpose, which may be automatically operated at the end of the completed cycle after all coils have been installed into the core, if desired, to pivot the arms in unison.

In the preferred embodiment, once the injection of coils 21–23 has been completed for the particular polar coil group, the tools are returned to their retracted position at A, and the carriage 27 reverses direction to pass through an intermediate position C (FIG. 1) where winding of the next coil polar group is begun. The direction of rotation of flyer 26 is automatically reversed during the formation of the next coil group, such as the way described in the Mason patent, to furnish an adjacent pole of different polarity from the one just installed into the stator core slots. With flyer 26 in the vicinity of position C and the tools retracted from core 14, assembly 60 and stator core 14 are released from their aligned positions at B and the core disengaged from member 32 by moving assembly 60 in a transverse or radial direction (toward the right in FIGS. 1 and 10). Thereafter, the core is indexed a predetermined angular distance for receiving the next polar group, for instance one hundred-eighty electrical degrees or ninety mechanical degrees in the exemplification. Assembly 60 and core 14 are finally returned to the aligned position at B in preparation for the next coil transfer and injection cycle.

In the illustrated embodiment, controlled radial or transverse movement of assembly 60 and subsequent indexing of core 14 are performed in the following manner. Wall 62 of assembly 60 includes a second recess 76 which houses an externally toothed index gear 77 and cam ring 78 which is held against the side of gear 77 by annulus 79 attached to the wall 62. A reciprocating rack 75 passes beneath index gear 77 (FIG. 10) and is held firmly against an L-shaped lug 88, attached to upright wall 62, by a standard piston type air cylinder 87 (FIG. 10) connected to end 86 of the rack. This forces assembly 60 into contact with threaded stop 85 which in turn controls the alignment of assembly 60 (and consequently core 14) with member 32. Actuation of the cylinder causes initial movement of the rack toward the right in FIG. 10. Coil spring 89, held under compression between plate 62 secured to stationary base 61 and the end of assembly 60, forces lateral movement of assembly 60 away from plate 61a until the other end of assembly 60 hits base 61 at side 61b (FIG. 10). This in turn will carry mandrel 64 and stator core 14 transversely away from member 32 to free the stator for angular motion. Usually a transverse distance of 1/8 inch is sufficient to disengage the stator core from key 33 of member 32.

Continued movement of the rack in the direction of the arrow in FIG. 10 (away from lug 88) will drive index gear 77 in a counterclockwise direction. Angular motion is transmitted to the core 14 through pawl 81 mounted on the side of gear 77 biased into a notch 82 adapted to interlock with the pawl during movement in this direction. These two components are free for relative movement in the other direction to provide a ratchet type action. The number of and distance between notches 82 correspond to the desired index angle to be provided for the core (four in the exemplification), which is locked to index with cam ring 78 by core-positioning pin 84 (FIGS. 1 and 3). Due to the loose axial fit between arms 71, 72 with core 14, they will not interface with the angular motion of core 14 on mandrel 64.

Once the proper angle of index has been achieved for core 14, movement of rack 75 may be terminated and the direction of travel reversed by any suitable means, e.g., a standard switch 90 operated by a cam follower riding in a cam track located on the rack beneath end 86. Flow through the cylinder 87 is reversed and the piston forced toward the left in FIG. 10. The rack will thus be driven away from the cylinder until it once again engages lug 88 while returning gear 77 clockwise to its pre-indexed location. Continued movement of rack 75 forces assembly 60 back against stop 75 and into the aligned position as the assembly concurrently compresses coil spring 89. During this action, rotation of cam ring 78 may be readily prevented by the provision of an anti-motion pawl 91 carried by annulus 79. This pawl is biased into a suitable notch 91a furnished on the outer face of cam ring 78 at the proper angular location relative to notch 82.

Consequently, assembly 60 is returned to its original pre-indexed position at "B" and another slot of core 14 becomes engaged with key 33 of member 32 to present selected slots for receiving additional coils during the next transfer and insertion cycle. A microswitch 97 may be attached to cooperate with four spaced apart grooves formed at appropriate locations in the outer surface of the cam ring 78 to indicate that the indexing components performed satisfactorily. This switch may be connected in the power circuit of the apparatus for disconnecting the apparatus from the power source should the core, if ever, be incorrectly indexed. This will stop the cycle to prevent transfer of additional coil groups.

Initiation of the above indexing operation may be automatically accomplished at the desired time by mounting a cam bar 92 (FIG. 11) onto carriage 27 so that it will make contact with a cam follower 93 operatively connected to the valve 94 of cylinder 87 when the carriage approaches position B. The valve should, of course, be operated subsequent to the withdrawal of the tools from the core.

It will be recalled that as the indexing operation is being performed, flyer 24 may be concurrently retracted from its advanced position to start winding another set of coils approximately at position C shown in FIG. 1. If desired, a wire retaining mechanism 101, having a pair of pivoted clamping jaws 102, 103, may be mounted adjacent position B for holding the conductor wire disposed between the flyer 26 and the inserted coils 21–23 inclusive for the start of the next winding operation. The clamping jaws are actuated to the closed position by air cylinder 104 when the flyer 26 is in its advanced location next to position B. A cam follower 96 (FIG. 11), operated by cam bar 92, serves to actuate a microswitch and the associated air valve of cylinder 104 for this purpose. Where mechanism 101 is used, flyer 26 should be stopped within ten degrees from the axis of member 32 (the closed position of the jaws being horizontally aligned with this axis) to insure that the wire is caught between the jaws.

For the core of the exemplification, the cycles of coil-transferring, inserting, core indexing, and coil winding of the next coil set as described above are repeated four times until all four poles have been installed into selected slots of the stator core in the exemplification. At the conclusion of these cycles, the wire retaining mechanism 101 may again be actuated to hold a part of the wire as it is being cut (not shown), either automatically or manually, between the already inserted coils and mechanism 101. If automatic cutting is desired, a conventional cutting device (not shown) may be attached next to mechanism 101 at the proper location and actuated by switch 98 (FIG. 9) having a follower in camming engagement with the circumferential cam surface of cam ring 78. A third switch and follower 99, also cooperating with the circumferential surface of cam ring 78, may be utilized to automate operate arms 71, 72 into the open position upon completion of the desired number of cycles. Thus, the angular position of the cam ring will determine the operation of switches 97, 98, 99 and will make a single revolution as the apparatus sequentially programs through all of its cycles to produce a completely wound stator core. The number of coil groups to be installed on the core will determine the exact number and angular positions of the cam notches and grooves formed in cam ring 78 to perform the functions already outlined.

SUMMARY OF THE ADVANTAGES

From the foregoing, it will be apparent that the present invention provides a number of advantages. Among other benefits, the axial development of one or more coils may be efficiently, rapidly, yet inexpensively achieved in slotted structures having slots of the same or differing configurations. The tendency for the coil turns to be excessively or improperly bent and the turn insulation as well as the turn material itself to be damaged during installation into the desired slots is greatly reduced if not entirely eliminated. In addition, the coil side turn portions are effectively pressed away from the slot entrances thereby reducing the tendency of the turns to pass out of the slots through the slot entrances. For some applications, the degree of coil press-back attained during axial insertion may be sufficiently great to eliminate the need for performing subsequent side turn pressing operations in the same slots. Further, proper indexing is obtained of slotted structures when more than one coil group is being installed. Replacement of parts in the apparatus is also facilitated by the simplicity of its components. Consequently, the invention is quite versatile in nature, permitting its satisfactory use with electrical conductors of different sizes and compositions even aluminum wire, and turn insulation having low abrasion-resistance qualities.

It should be apparent to those skilled in the art, while we have shown and described what at present is considered to be the preferred embodiment of our invention in accordance with the patent statutes, it is to be understood that modifications can be made without actually departing from the true spirit and scope of this invention. For example, the stator and its supporting structure could be moved in an axial direction during the coil transferring and inserting operations. We therefore intend to cover in the following claims all such equivalent variations as fall within the invention.

What we claim as new and desire to secure by letters patent of the United States is:

1. A method for developing at least one electrical coil formed of a number of conductor turns comprising the steps of: forming at least one coil of a number of conductor turns from conductive wire material in a first position having side turn portions adapted to be accommodated in selected slots of a slotted magnetic core provided with an opening in communication through associated slot entrances with the selected slots, the at least one coil further having end turn portions adapted to extend beyond the selected slots; transferring the at least one coil to a location next to the selected slots of the slotted magnetic core disposed at a second position by pressure engagement of pressure-applying surfaces of a device with some of the turns; and axially inserting the side turn portions into the selected slots, while maintaining the core in the second position, by causing the pressure-applying surfaces to enter the slots at a predetermined core end face in pressure engagement with the turns and concurrently forcing the side turn portions of the at least one coil away from the slot entrances by the pressure engagement of the pressure-applying surfaces therewith, whereby the tendency of the turns to be adversely affected and to be located in the associated slot entrances is reduced.

2. The method of claim 1 in which during the transfer and inserting steps, at least some of the turns are held against tapered and curved sections of the device to reduce the tendency of the turns to be improperly bent in the vicinity of these sections; and the additional step of removing the tapered and curved sections in an axial direction from the selected slots once the side turn portions have been placed into the selected slots away from the associated slot entrances, with the tapered and curved sections facilitating the removal of the pressure-applying surfaces from the selected slots without causing the side turn portions to enter the associated slot entrances.

3. The method of claim 1 in which subsequent to the inserting of the side turn portions, the method includes the steps of axially removing the pressure-applying surfaces from the selected slots; releasing the core from the second position by moving the core in a radial direction; indexing the core through a predetermined angle; and returning the core radially back into the second position preparatory to the insertion of additional coils into slots of the core.

4. The method of claim 3 including the step of forming at least one additional coil from conductive wire material in the first position and retaining a part of the conductive wire material between the at least one coil accommodated in the selected slots and the at least one additional coil for a part but not all of the formation of the at least one additional coil to assist in initiation of the coil formation and to permit that part of the conductive wire to be free during the angular indexing of the core.

5. A method of axially inserting a number of coil turns of electrically conductive material into selected slots of a magnetic core in communication through associated entrances with an enlarged opening in the core, the method comprising the steps of: aligning the coil turns axially with the selected slots and the enlarged core opening and externally of the core; inserting predetermined turn portions of the coil turns axially into the selected slots by engaging the turn portions with enlarged curved wall sections of tools entering the selected slots and by engaging other turn portions with adjacent leading sections having a transverse dimension less than that of the curved wall section entering the slot entrances, and causing the turn portions while still engaged by the curved and leading sections to continue to move axially within the selected slots and associated slot entrances until the predetermined turn portions are disposed in the desired positions within the selected slots away from the enlarged opening; and removing the curved and leading sections from the selected slots and associated entrances without effecting movement of the predetermined turn portions into the enlarged opening of the core.

6. Apparatus for axially inserting side turn portions of at least one electrical coil wound from conductor wire into selected axially extending slots of a slotted structure having the slots in communication through associated entrances with a peripheral surface thereof, the apparatus comprising a mechanism for supporting the slotted structure in a predetermined position; and a coil-transfer device supported in axial alignment with selected slots of the slotted structure adjacent the mechanism for axially inserting the coil side portions into the selected slots through the associated slot entrances when the slotted structure is supported in the predetermined position, said coil-transfer device including coil-placing means having pressure-applying walls entering the selected slots in pressure engagement with some of the turns in a generally axial direction for effecting axial insertion of the side turn portions into the selected slots and for forcing the side turn portions away from the associated entrances, whereby the tendency of the side turn portions to be deleteriously affected and to subsequently exit through the associated slot entrances is reduced.

7. The apparatus of claim 6 in which the coil-placing means includes at least one leading section adjacent a curved wall section adapted to pressure engage some of the turn portions and to pass into the associated entrances, and a trailing section formed on the end of the curved wall section remote from the leading section and extending radially and axially away from the curved wall section, said trailing section being adapted to enter the selected slot and to facilitate release of the pressure engagement with the side turn portions as the curved wall and trailing sections are being withdrawn from the selected slot.

8. The apparatus of claim 6 in which the mechanism for supporting the slotted structure comprises means or firmly holding the slotted structure in the predetermined position when the coil-transfer device is effecting axial insertion of the side turn portions into the selected slots, means for moving the holding means and slotted structure away from the predetermined position, for turning the slotted structure through an angle, and for subsequently returning the holding means and slotted structure to the predetermined position, whereby the slotted structure is indexed to receive additional electrical coils.

9. Apparatus for axially inserting insulated turn portions of at least one electrical coil, wound of a number of conductor turns, into selected slots extending axially between end faces of a dynamoelectric machine core having slot entrances in communication with an enlarged opening of the core, the apparatus comprising means for supporting the dynamoelectric machine core; and coil-inserting means for axially placing turn portions in the selected slots, the coil-inserting means including a first section adapted to engage some of the turn portions and to enter a selected slot from one end face of the core, and a second section adjacent the first section adapted to engage some turn portions in the vicinity of the engagement of the first section and to pass axially into the associated slot entrances as the first section enters the seleced slot, with the transverse dimension of the second section being less than that of the first section, whereby the sections effect axial insertion of the engaged turn portions and press such portions in the selected slot in a direction away from the associated entrance without causing damage to the turn insulation.

10. The apparatus in claim 9 in which the first and second sections are formed with a continuous curve to reduce the extent of bend occuring to the turns at that location.

11. Apparatus for axially inserting side turn portions of at least one electrical coil wound from conductor wire into selected axially extending slots of a slotted structure having the slots in communication with a peripheral surface thereof through associated entrances and with end face peripheral surfaces of the slotted structure, the apparatus comprising a device disposed in axial alignment with selected slots of the slotted structure adjacent a predetermined end face peripheral surface, said device including at least one element arranged to pass portions of at least one electrical coil axially adjacent the associated slot entrances of the selected slots, said at least one element including extensions formed with leading sections having first regions adapted to pass axially along the slot entrances and second regions having pressure-applying surfaces adapted to pass into and axially along the slots, and means for causing relative axial movement of the at least one element and the selected slots to pass the pressure-applying surfaces of the leading sections into and along the selected slots for inserting axially the side turn portions therein while concurrently pressing the side turn portions back into the selected slots away from the associated slot entrances.

12. The apparatus of claim 11 in which the at least one element has a transverse shoulder extending between the leading sections of two extensions for engaging a portion of the at least one electrical coil to assist in effecting its axial insertion.

13. The apparatus of claim 11 in which the first regions have cross-sectional transverse dimensions less than those of said second regions and said pressure-applying surfaces are generally sloped to facilitate axial insertion of the at least one electrical coil and removal of the extensions from selected slots and from the associated slot entrances.

14. A method for developing at least one electrical coil formed of a number of conductor turns having side portions adapted to be accommodated in selected slots of a slotted magnetic core, a peripheral surface in communication with the selected slots through associated slot entrances, the at least one coil further having end turn portions adapted to extend beyond slot openings at end free peripheral surfaces with the selected slots and associated slot entrances in communication with the selected slots, the steps comprising: disposing the at least one coil in a location next to the selected slots of the slotted magnetic core adjacent a peripheral surface thereof with some of the turns adapted to enter into the selected slots; axially placing at least the side turn portions into the selected slots by pressure engagement with a pressure-applying surface of an element moving therewith within the selected slots and applying pressure in a direction away from the associated slot entrances to the side turn portions of the at least one electrical coil within the selected slots as the side turn portions are being placed by pressure engagement with the same surface of the element which axially places at least the side turn portions, whereby the tendency of the quality of at least the side turn portions to be adversely affected is reduced.

15. The method of claim 14 in which during the axially placing of at least the side turn portions, the steps of inserting the side turn portions into the selected slots through openings at a predetermined end face peripheral surface as a part of the end turn portions are being axially advanced through the associated slot entrances, and maintaining at least such part in an arc firmly against a part of the pressure-applying surface during the axial insertion of the at least one electrical coil to reduce the tendency of relative sliding motion and the turn portions to become adversely affected.

References Cited

UNITED STATES PATENTS 2,432,267   12/1947   Adamson _____ 29—596
2,732,804   11/1955   Martin _____ 242—1

(Other references on following page)

UNITED STATES PATENTS

| | | | |
|---|---|---|---|
| 2,836,204 | 5/1958 | Mason | 140—92.1 |
| 2,873,514 | 2/1959 | Mills | 29—205 |
| 3,151,638 | 10/1964 | Hill | 140—92.1 |
| 3,324,536 | 6/1967 | Hill | 29—205 |

JOHN E. CAMPBELL, Primary Examiner

C. E. HALL, Assistant Examiner

U. S. Cl. X.R.

29—205, 605, 606